(12) United States Patent
Nishihara et al.

(10) Patent No.: US 7,193,923 B2
(45) Date of Patent: Mar. 20, 2007

(54) SEMICONDUCTOR MEMORY DEVICE AND ACCESS METHOD AND MEMORY CONTROL SYSTEM FOR SAME

(75) Inventors: Toshiyuki Nishihara, Kanagawa (JP); Hidetoshi Yamanaka, Saitama (JP); Daisuke Yoshioka, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 11/201,309

(22) Filed: Aug. 11, 2005

(65) Prior Publication Data

US 2006/0047888 A1  Mar. 2, 2006

(30) Foreign Application Priority Data

Aug. 26, 2004 (JP) ............................. 2004-246249

(51) Int. Cl.
*G11C 8/00* (2006.01)
(52) U.S. Cl. .............................. 365/230.03; 365/230.08
(58) Field of Classification Search ........... 365/230.03, 365/230.08, 189.05
See application file for complete search history.

(56) References Cited

U.S. PATENT DOCUMENTS 5,973,964 A * 10/1999 Tobita et al. .......... 365/185.29
6,484,246 B2 * 11/2002 Tsuchida et al. ............ 711/169

* cited by examiner

*Primary Examiner*—Vu A. Le
(74) *Attorney, Agent, or Firm*—Rader Fishman & Grauer PLLC; Ronald P. Kananen (57) ABSTRACT

A semiconductor memory device using inexpensive block access semiconductor memories for storage media and able to be treated like a usual randomly accessible system memory, including a first semiconductor memory and a second semiconductor memory, wherein the second semiconductor memory is a cache of the first semiconductor memory, the first semiconductor memory is accessed via the second semiconductor memory, there are a first address region and a second address region on logical memory addresses accessed from the outside, at least part of the second semiconductor memory is mapped to the first address region, and a function of controlling data transfer between the first semiconductor memory and the second semiconductor memory by accessing the second address region is provided, and an access method and a memory control system of the same.

15 Claims, 9 Drawing Sheets

SEMICONDUCTOR MEMORY DEVICE AND ACCESS METHOD AND MEMORY CONTROL SYSTEM FOR SAME

CROSS REFERENCES TO RELATED APPLICATIONS

The present invention contains subject matter related to Japanese Patent Application No. 2004-246249 filed in the Japan Patent Office on Aug. 26, 2004, the entire contents of which being incorporated herein by reference.

BACKGROUND OF THE INVENTION

1. Field of the Invention

The present invention relates to a semiconductor memory device, and more particularly relates to a semiconductor memory device having a built-in cache memory and an access method and a memory control system for the same.

2. Description of the Related Art

In recent years, demand for NAND type flash memories and other block access type semiconductor memories has been rapidly growing.

Figure 1:
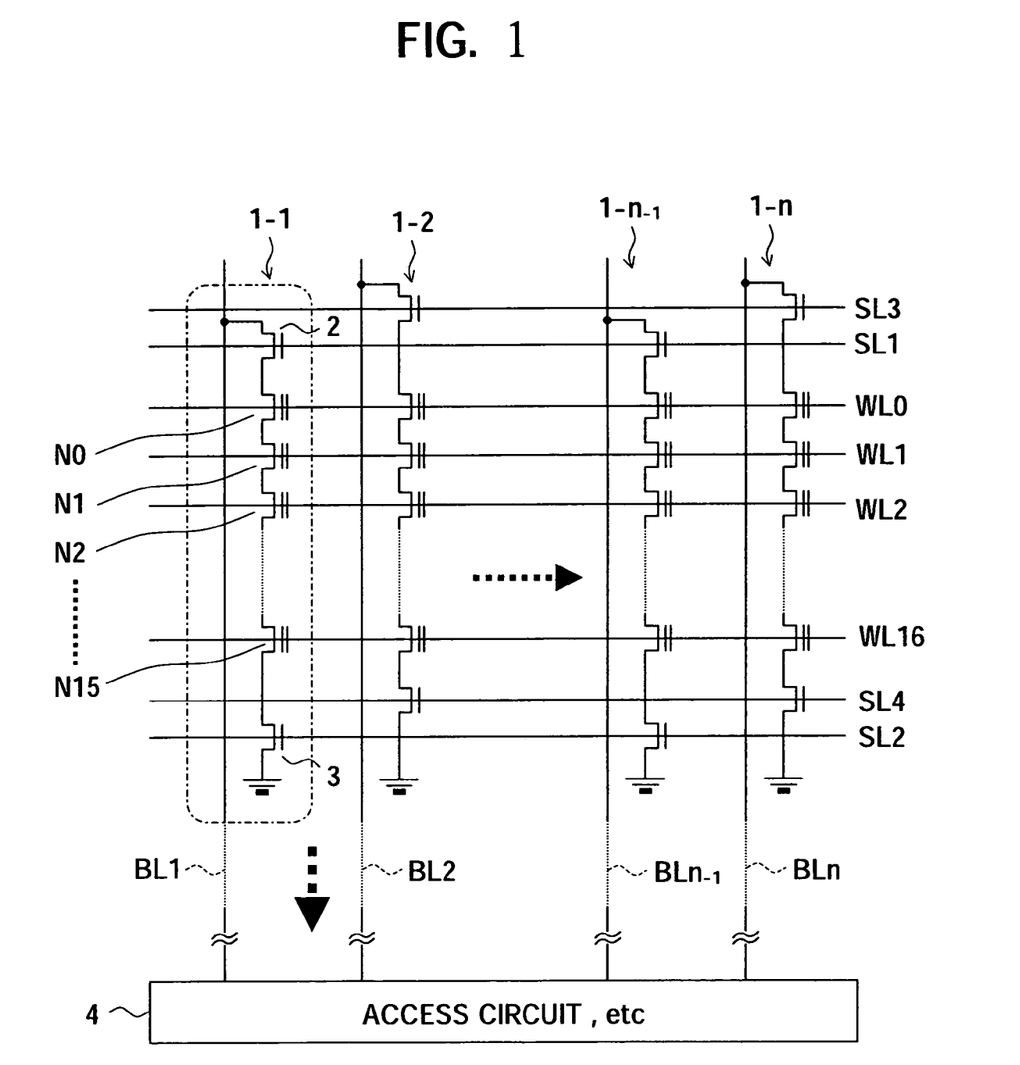
FIG. 1 is a view of an example of an internal configuration of a NAND type flash memory as an example of a block access type memory.

FIG. 1 is a view of an example of the internal configuration of an example of a block access type memory, that is, a NAND type flash memory. The NAND type flash memory of FIG. 1 has a plurality of memory units 1-1 to 1-n connected to bit lines BL1 to BLn and arrayed in an array (vertically and laterally). The memory units 1 (-1 to -n) are sandwiched between selection transistors 2 and 3 and include for example 16 memory cells N0 to N15 connected in series. For example, gates of the selection transistors 2 and 3 in odd number columns are connected to selection gate lines SL1 and SL2, while gates of the selection transistors 2 and 3 in even number columns are connected to selection gate lines SL3 and SL4. Further, the gates of the memory cells N0 to N15 are connected to word lines WL0 to WL15.

The memory cells N0 to N15 have multilayer gate structures and store data according to the charges built up in the floating gates. Namely, when many electrons build up in a floating gate, the threshold value of the transistor rises, therefore any current penetration through the memory units 1 (-1 to -n) from the charged bit lines BL1 to BLn is detected at an access circuit 4 including a sense amplifier, etc. and the data is judged.

In such a NAND type flash memory, no contact to the bit line for each memory cell is necessary, therefore the effective cell size can be reduced. This is also advantageous for reducing costs. However, a large number of cell transistors are connected in series, therefore the read current of each unit is very small. Further, in order to reduce peripheral circuits, the array becomes very large. The load capacitances of the word lines and the bit lines are large, and a long time is required for driving them. Accordingly, this is not suitable for random access in units of bytes or words. Either such specifications are not provided, or an access time of tens of µs is required. Namely, in order to produce such a memory cheaply, the access performance at the cell level is sacrificed.

However, the data of the large number of cells connected to a selected word line in the array is simultaneously read out by the sense amplifier in parallel. Therefore, an increase in speed is possible in block units of several kB. Namely, once header data is read, continuous data can be read at a high speed.

Further, the speed of write operations can be similarly increased by the same parallel processing. In, for example, a NAND type flash memory, a low current write operation by Fowler-Nordheim (F-N) injection is possible. Therefore, the speed of transfer in block units is faster than the speed of NOR type flash memories by close to 2 orders.

Such a memory is mainly used as a user file storage for portable phones, digital cameras, etc. at present.

Figure 2:
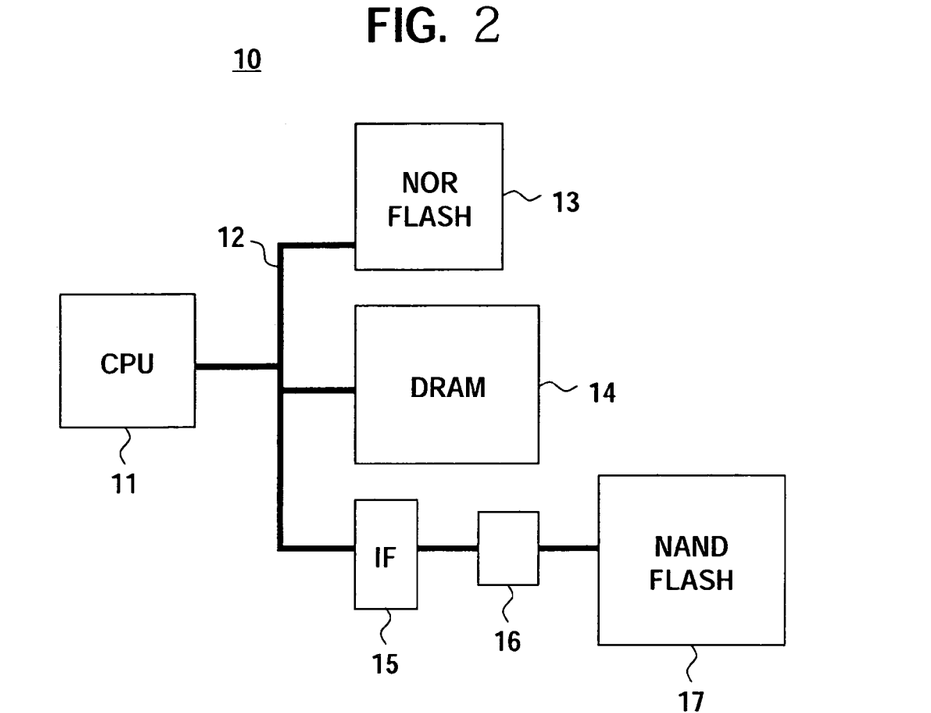
FIG. 2 is a block diagram conceptually showing the system configuration in a case using flash memories for user file storage.

FIG. 2 is a block diagram conceptually showing the system configuration when using flash memories for user file storage.

This system 10 is comprised of a central processing unit (CPU) 11, a NOR type flash memory 13, and a dynamic random access memory (DRAM) 14 connected via a system bus 12. Both memories are mapped as regions in the system memory. The NOR type flash memory 13 stores the boot code, operating system (OS), and applications. Further, the DRAM 14 is loaded with part of the applications for execution and forms a work area of the OS.

The system bus 12 is further connected to an interface circuit (IF) 15 for accessing an external memory device and the interface circuit 15 is connected to a control circuit 16 for controlling a NAND type flash memory 17. The control circuit 16 inputs/outputs and transfers data of the NAND type flash memory 17 matched with the specifications of the interface circuit 15 determined by ATA standard etc., and further has a function of converting a logical address designated from the outside to a physical address of the memory 17, a function of encoding and correcting errors of the data read out from the memory 17 at an ECC circuit, and other functions.

Figure 3:
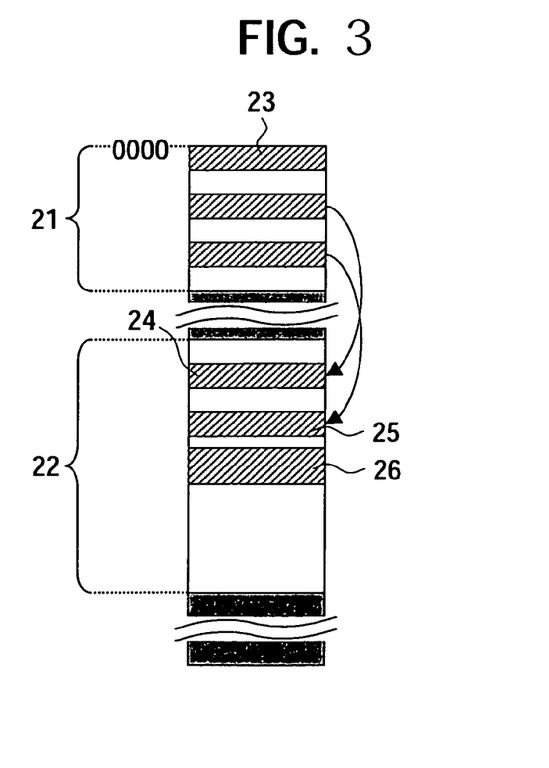
FIG. 3 is a diagram showing an example of a memory map of the system of FIG. 2.

FIG. 3 is a view of an example of a memory map of the system of FIG. 2. In FIG. 3, 21 indicates the memory region of the NOR type flash memory 13, and 22 indicates the memory region of the DRAM 14.

When the system is started up, the CPU 11 accesses the NOR type flash memory region 21 first and executes the boot code 23 thereof. In that process, various types of programs are loaded into the DRAM region 22 from the NOR type flash memory region 21 for execution. For example, driver software 24 for operating the interface circuit 15 is loaded and executed. Access to the NAND type flash memory 17 becomes possible at that point of time. The flash memory 17 is not mapped to the system memory. An IO map space is separately provided, and data is transferred using a specific protocol prescribed by the interface circuit 15 and the driver software 24 via a register mapped there.

A long time is taken for extracting the desired portion of the block type data, therefore block device management software 25 is loaded and executed and a block data cache region 26 is secured and managed.

When the NAND type flash memory 17 becomes usable in this way, it is mainly used for storing user data as files. Further, parts of the applications are stored as files. These are sometimes loaded, opened up, and executed in empty regions in the DRAM 14.

SUMMARY OF THE INVENTION

As explained above, the related system configuration assigns different roles to and selectively uses two types of flash memories. However, there are the following disadvantages in such memories.

First, as explained above, while a NAND type flash memory is an inexpensive non-volatile memory, it is not suitable for random access. Further, a long time is required for acquiring the initial data. Accordingly, it cannot be accessed like a usual system memory and ends up being treated like a block access external memory device in the same way as a hard disk. As a result, the interface circuit 15 for the external memory device becomes necessary, so the mounting of the memory device and the circuit configuration of the system become more complex. Further, the driver software 24 is necessary for operation of the interface circuit 15 as explained above, and the transfer performance of the memory is restricted by its protocol.

Further, the host controller cannot efficiently transfer data unless a cache memory region 26 is separately provided in the system memory and managed by management software 25. At that time, the management software needs to perform a variety of processing such as monitoring of updating of data and further, in certain cases, providing a backup mechanism to deal with instantaneous interruptions in power. Accordingly, the host controller has to handle much additional work when handling block data, so good processing performance is hard to achieve.

On the other hand, a NOR type flash memory 13 can perform random read operations in units of words and can be treated as the system memory, but is expensive. Further, usually it can only be accessed as a read only memory (ROM) and cannot be treated as a random access memory (RAM). Overwriting requires exceptional operations different from ordinary access and in addition takes a very long time.

In recent years, home appliances have been given multiple functions and given communication abilities. In increasing cases, their programs are frequently updated on line. The disadvantages of the above NOR type flash memories are particularly serious in such instances.

SUMMARY OF THE INVENTION

It is therefore desirable to provide a semiconductor memory device using inexpensive block access semiconductor memories like NAND type flash memories for storage media and able to be treated like a usual randomly accessible system memory and to provide an access method and a memory control system for the same.

According to a first aspect of an embodiment of the present invention, there is provided a semiconductor memory device including a first semiconductor memory and a second semiconductor memory, wherein the second semiconductor memory is a cache of the first semiconductor memory, the first semiconductor memory is accessed via the second semiconductor memory, there are a first address region and a second address region on logical memory addresses accessed from the outside, at least part of the second semiconductor memory is mapped to the first address region, and a function of controlling data transfer between the first semiconductor memory and the second semiconductor memory by accessing the second address region is provided.

Preferably, the device has a function of transferring a desired block region data in the first semiconductor memory to the second semiconductor memory in accordance with predetermined information being written to the second address region from the outside.

Preferably, the device has a function of judging whether or not the desired block region data in the first semiconductor memory is being transferred to the second semiconductor memory by predetermined data being read from the second address region.

Preferably, the first semiconductor memory is a block access type large size memory, the second semiconductor memory is a random access type small size memory, and the data transfer between the first semiconductor memory and the second semiconductor memory is carried out in units of blocks.

Preferably, the device has a function of transferring a desired block region in the first semiconductor memory to the cache region of the second semiconductor memory in accordance with predetermined information being written into the second address region from the outside and notifying completion of the transfer to the outside when the transfer is completed.

Preferably, the first semiconductor memory is a nonvolatile memory and has a function of detecting the power being turned on or a reset being input and automatically transfers and stores a predetermined region data of the first semiconductor memory to the second semiconductor memory.

Preferably, the first address region is set in one-to-once correspondence with the logical address region of the first semiconductor memory and when the first address region is accessed, the corresponding region in the first semiconductor memory is accessed via the second semiconductor memory.

Preferably, correspondence information indicating which region of the first semiconductor memory is stored in which region of the second semiconductor memory is stored, and when the first address region is accessed from the outside, the second semiconductor memory is accessed according to an internal address converted and generated from the input address and the correspondence information.

According to a second aspect of an embodiment of the present invention, there is provided a memory control system having a semiconductor memory device and a host device executing at least a management program to access the semiconductor memory device, wherein the semiconductor memory device includes a first semiconductor memory and a second semiconductor memory, the second semiconductor memory is the cache of the first semiconductor memory, the first semiconductor memory is accessed via the second semiconductor memory, there is a first address region and a second address region at logical memory addresses accessed from the host device, at least part of the second semiconductor memory is mapped to the first address region, functions of controlling the data transfer between the first semiconductor memory and the second semiconductor memory by accessing the second address region and transferring a desired block region data in the first semiconductor memory to the second semiconductor memory in accordance with predetermined information being written into the second address region from the host device are provided, and the host device executes a management program making the host controller write predetermined information into the second address region of the semiconductor memory device according to need when accessing the semiconductor memory device and making the semiconductor memory device transfer the desired block region to the cache region and, when the transfer is completed, notify the completion of the transfer to the host controller.

According to a third aspect of an embodiment of the present invention, there is provided an access method of a semiconductor memory device including a first semiconductor memory and a second semiconductor memory comprising steps of accessing the first semiconductor memory via the second semiconductor memory using the second semiconductor memory as the cache of the first semiconductor memory, forming a first address region and a second address region at logical memory addresses accessed from the outside, mapping at least part of the second semiconductor memory in the first address region, and transferring data between the first semiconductor memory and the second semiconductor memory by accessing the second address region.

That is, the semiconductor memory device according to an embodiment of the present invention is configured by a first semiconductor memory and a second semiconductor memory, the second semiconductor memory is the cache of the first semiconductor memory, and the first semiconductor memory is accessed via the second semiconductor memory. The device has a randomly accessible cache region and a cache control region at logical memory addresses. At least part of the second semiconductor memory is mapped to this cache region. By accessing the cache control region from the outside, data transfer between the first semiconductor memory and the second semiconductor memory is controlled. Further, desirably, as the processing at the time of a miss hit, the desired block region in the first semiconductor memory is transferred to the cache region in accordance with predetermined information being written into the cache control region from the outside.

Further, in the memory control system, the host device executes the following management program according to need when accessing the semiconductor memory device. Namely, the management program writes the address information of the desired region to the cache control region of the semiconductor memory device, makes the memory device transfer the corresponding region to the cache region, and notifies completion to the host controller when the transfer is completed.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Below, an embodiment of the present invention will be explained with reference to the drawings.

Figure 4:
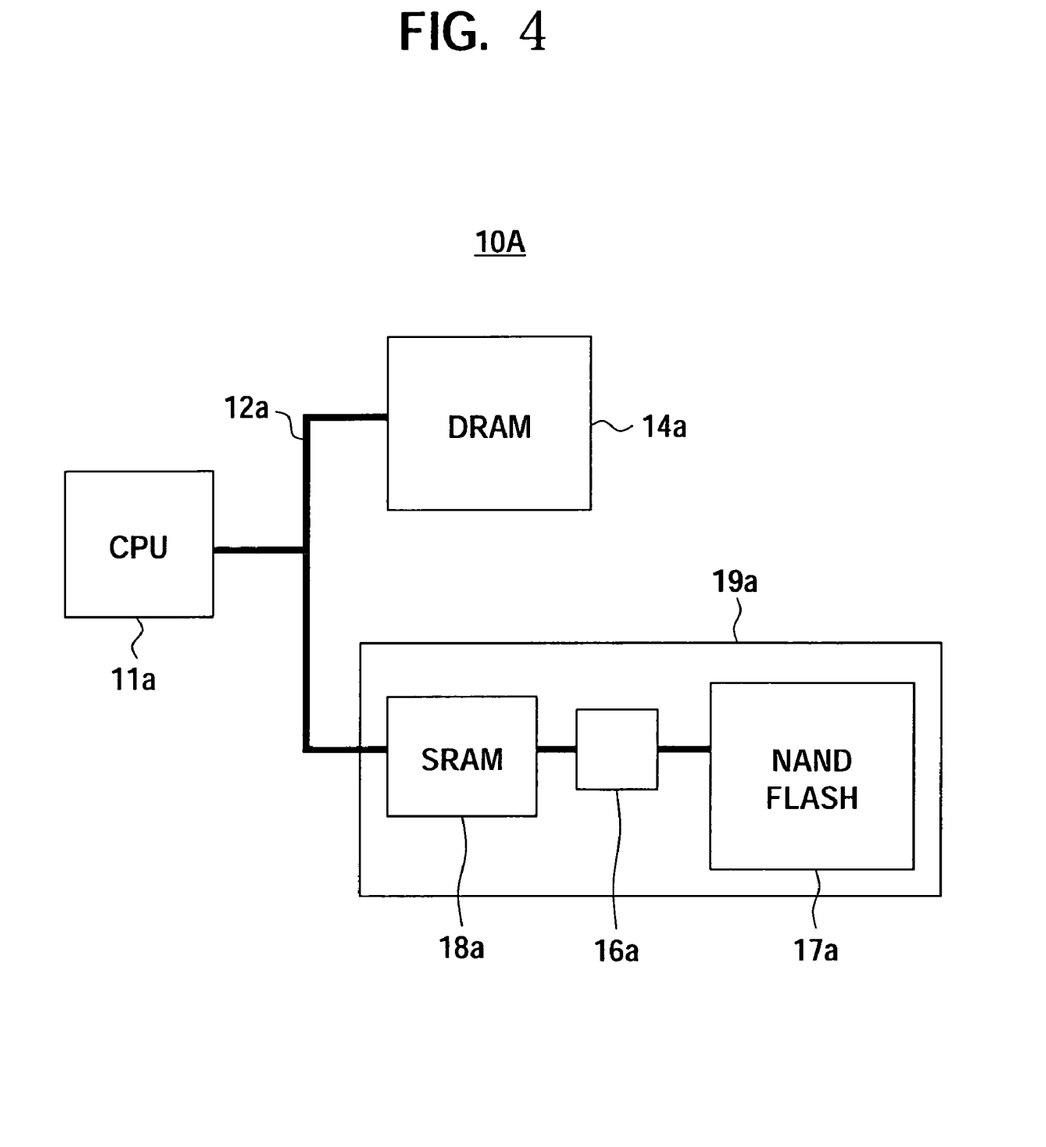
FIG. 4 is a block diagram of a memory control system employing a semiconductor memory device according to an embodiment of the present invention.

FIG. 4 is a block diagram of a memory control system employing a semiconductor memory device according to an embodiment of the present invention.

The system 10 has, as shown FIG. 4, for example, a host device constituted by a CPU (also referred to as a "host CPU") 11a, a system bus 12a, a DRAM 14a, and a semiconductor memory device (hereinafter, also referred to as a "memory device") 19a including a first semiconductor memory and a second semiconductor memory as principal components.

In the system 10A, the DRAM 14a and the memory device 19a are connected to the CPU 11a via the system bus 12a. The memory device 19a is compatible in pins with a NOR type flash memory, and can be mounted on a general board as it is.

The memory device 19a is configured by the second semiconductor memory constituted by a static random access memory (SRAM) 18a having a capacity of 2 Mb, a control circuit 16a, and the first semiconductor memory constituted by a NAND type flash memory 17a having a capacity of 1 Gb in the same package. The SRAM 18a is used as the cache of the NAND type flash memory 17a. Accordingly, in the following description, the SRAM is sometimes referred to as an "SRAM cache". The inside of the NAND type flash memory 17a is divided into a plurality of banks. By operating them in parallel, high speed transfer of block data is possible.

The control circuit 16a executes and controls the transfer between the SRAM 18a and the NAND type flash memory 17a as will be explained later and, in the present embodiment, is mounted on the same chip as the SRAM 18a. The control circuit 16a has a function of converting a logical address of the NAND type flash memory 17a to a physical address and prohibiting access to an error block, a function of encoding and correcting an error of data read out from the NAND type flash memory 17a by an ECC circuit, and other functions.

Note that, when employing a configuration providing the cache memory (SRAM cache) 18a at the memory device 19a side in this way, the bus width between the NAND type flash memory 17a as the main memory and the SRAM 18a as the cache memory and the transfer frequency can be uniquely set in the memory device 19a. Especially, packaging technology has been remarkably improved in recent years. Therefore, it is possible to arrange the two memories 17a and 18a close so as to reduce the load on the buses between the two and to make them wider than the system bus 12a or raise the frequency so as to achieve a great improvement of the transfer performance.

Figure 5:
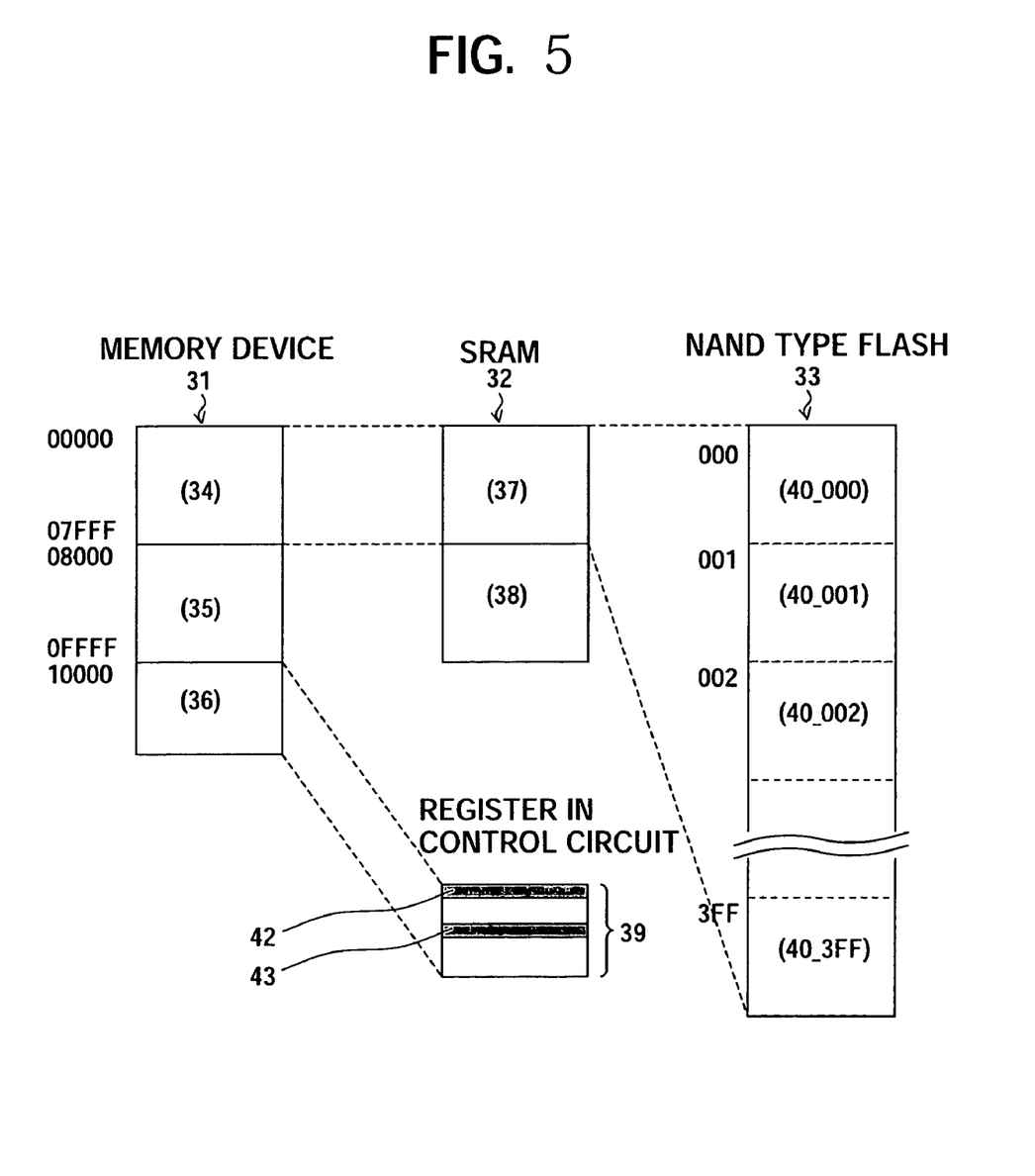
FIG. 5 is a diagram showing a first example of mapping of logical addresses of a memory device and logical addresses of a SRAM cache and a NAND type flash memory forming the inside thereof in the present embodiment.

FIG. 5 is a diagram showing a first example of mapping of logical addresses of the memory device 19a and logical addresses of the SRAM cache 18a and the NAND type flash memory 17a configuring the inside thereof in the present embodiment.

In FIG. 5, 31 indicates the logical addresses of the memory device 19a, 32 indicates the logical addresses of the SRAM cache 18a, and 33 indicates the logical addresses of the NAND type flash memory 17a. Further, 34 to 36 indicate address regions of the memory device 19a, and 37 and 38 indicate address regions of the SRAM cache 18a.

In the present embodiment, the logical addresses 31 and 32 of the memory device 19a and the SRAM cache 18a are assigned in units of words each consisting of 32 bits matching with the input/output width of the memory device, and the addresses 33 of the NAND type flash memory 17a are assigned in units of 1M bit erasure blocks.

The address region 34 of the memory device 19a is directly mapped to the address region 37 of the SRAM 18a. When this address region is accessed from the outside, the SRAM 18a is therefore immediately accessed. On the other hand, the address region 35 of the memory device 19a is prohibited from use here and is not mapped anywhere. Further, the register 39 in the control circuit 16a is mapped to the address region 36 of the memory device 19a. By accessing this portion, it is possible to judge the internal state of the SRAM 18a and control the data transfer between the SRAM 18a and the NAND type flash memory 17a.

Further, the address region 37 of the SRAM 18a serves as a cache for all of the logical addresses 33 of the NAND type flash memory 17a. Namely, 1 block is selected from the region of the logical addresses 33. That group of data is transferred inside the memory device 19a at a high speed and stored in the address region 37 in the SRAM 18a. For example, when a block address "001" is written into a TAG portion 42 in the register 39 from the outside, the control circuit 16a detects that and transfers the block (40_001) to the address region 37 for storage.

The remaining half of the address region 38 of the SRAM 18a is usually not mapped to any address region of the memory device 19a and not seen by the user, but is used as a buffer at the time of writing data or as a standby region for coping with the following case.

Namely, when a block stored in the address region 37 of the SRAM 18a is updated from the outside, it must be written back to the original block of the logical address region 33 in the NAND type flash memory 17a. The data writing time of the NAND type flash memory 17a is slower than the reading time by close to two orders, therefore when trying to read a new block from the outside and an old block is updated, if waiting until the old block finishes being written and the address region 37 is released, a very long time would be taken. The operation of the host controller would be suspended during that time.

Accordingly, when for example reading of the block (40_002) of the NAND type flash memory 17a is newly requested and the data of an old block (40_001) stored in the address region 37 of the SRAM 18a is updated, the following processing is carried out.

First, the updated block data of the address region 37 of the SRAM 18a is transferred to the address region 38 as the buffer at a high speed. Next, the data of the new read out block is immediately loaded in the address region 37 of the SRAM 18a from the block (40_002) of the NAND type flash memory 17a. Thereafter, the data of the old block (40_001) in the logical address 33 of the NAND type flash memory 17a is erased, and the updated data is transferred from the buffer 38 of the SRAM 18a. Due to this, even if not waiting for the erasing and writing, a user can freely access the data of the new read out block of the cache region 37.

Alternatively, it is possible to change the region mapped to the cache region (address region) 34 of the memory device 19a from the region 37 to the region 38 of the SRAM 18a and to load the data of the new read out block (40_002) of the NAND type flash memory 17a to the region 38. After a while, the data of the old block (40_001) at the logical address 33 of the NAND type flash memory 17a is erased, and the updated data is transferred from the address region 37 of the SRAM 18a. Thereafter, the address region 37 of the SRAM 18a becomes a standby region.

The memory device 19a memory accesses the address region 36 from the outside and therefore can perform various types of control such as confirmation of hits to the cache and internal transfer of desired blocks. By combining that and the access to the cache region 34, it is possible to freely access the logical addresses 33 of the NAND type flash memory 17a while having a general purpose memory interface.

For example, by referring to the data of the TAG portion 42 in the internal register 39 mapped to the address region 36 of the memory device 19a, it can be confirmed whether or not a desired block is stored in the cache.

When it is not there, for example, the TAG portion 42 is rewritten to the desired block address. The control circuit 16a in the memory device 19a detects this and transfers the group of data of the desired block from the region 33 in the NAND type flash memory 17a to the region 37 in the SRAM 18a for storage. When the transfer is completed, the fact that access from the outside is possible is notified to a status display 43 provided a part of the internal register 39.

The CPU as the host controller (hereinafter referred to as the "host CPU") 11a executes a management program as in for example FIG. 6 according to need when accessing the memory.

This program first reads out the TAG portion 42 (ST1). When it coincides with the desired block address (ST2), it notifies access permission to the host CPU 11a (ST3). When it conversely does not coincide (ST2), the block address is written into the TAG portion 42 (ST4). The status display 43 is periodically checked after that (ST5 to ST7). When the status display 43 displays completion of the internal transfer, access permission is notified to the host controller (ST3). In this way, all of the control from the management program to the memory device 19a is executed by usual memory access to the address region 36 of the memory device 19a. No special interface for the external memory device is necessary.

The host CPU 11a waits for notification of access permission from the management program and starts the access to the cache region 34 of the memory device 19a. This portion can be randomly accessed at a high speed in the same way as a usual general purpose memory. Note that when the host side knows the blocks which have been already transferred to the cache, the management program may execute only parts of transfer and notification of completion in response to a request of the host controller.

Figure 7:
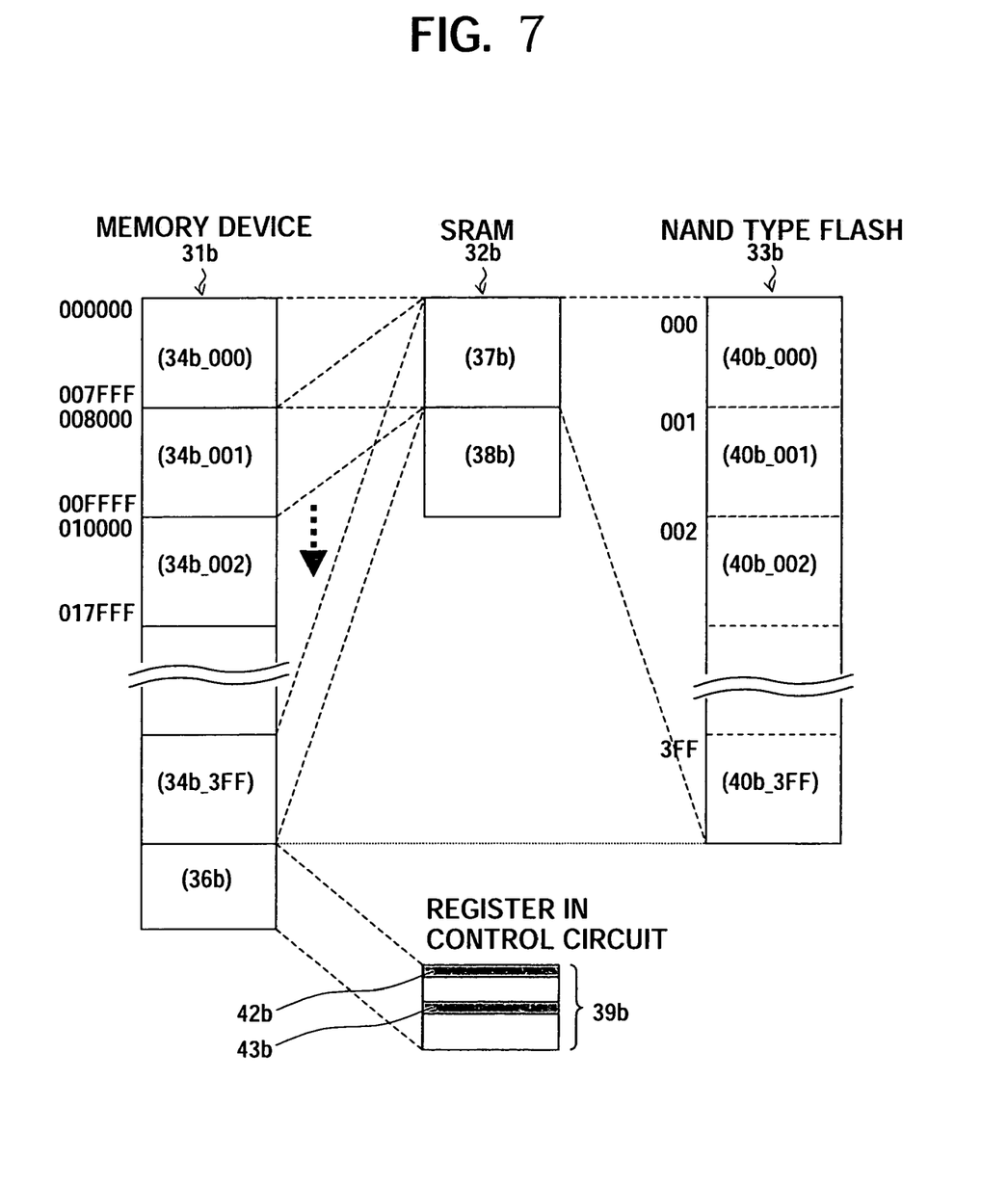
FIG. 7 is a diagram showing a second example of mapping of logical addresses of the memory device and logical addresses of the SRAM cache and a NAND type flash memory forming the inside thereof in the present embodiment.

FIG. 7 is a diagram showing a second example of mapping of logical addresses of the memory device 19a and logical addresses of the SRAM cache 18a and the NAND type flash memory 17a configuring the inside thereof in the present embodiment.

In the second example of mapping, a region 37b of the SRAM 18a is multiply mapped to the logical address regions (34b_000) to (34b_3FF) of the memory device 19a.

Namely, when the above region of the memory device 19a is accessed, the same region 37b of the SRAM 18a will be accessed.

On the other hand, the register 39b in the control circuit 16a is mapped to the address region 36b of the memory device 19a. By accessing this portion, the internal state of the SRAM 18a can be judged and data transfer between the SRAM 18a and the NAND type flash memory 17a can be controlled.

In this configuration, the logical address regions of the memory device 19a are set in one-to-one correspondence to the block regions of the NAND type flash memory 17a as they are via the region 37b of the SRAM 18a. The data in the flash memory can be handled as if it were mapped to the system memory. For example, the programs and data stored in the block (40b_001) of the NAND type flash memory 17a can be accessed using an inherent logical address corresponding to the region (34b_001) of the memory device 19a.

Figure 6:
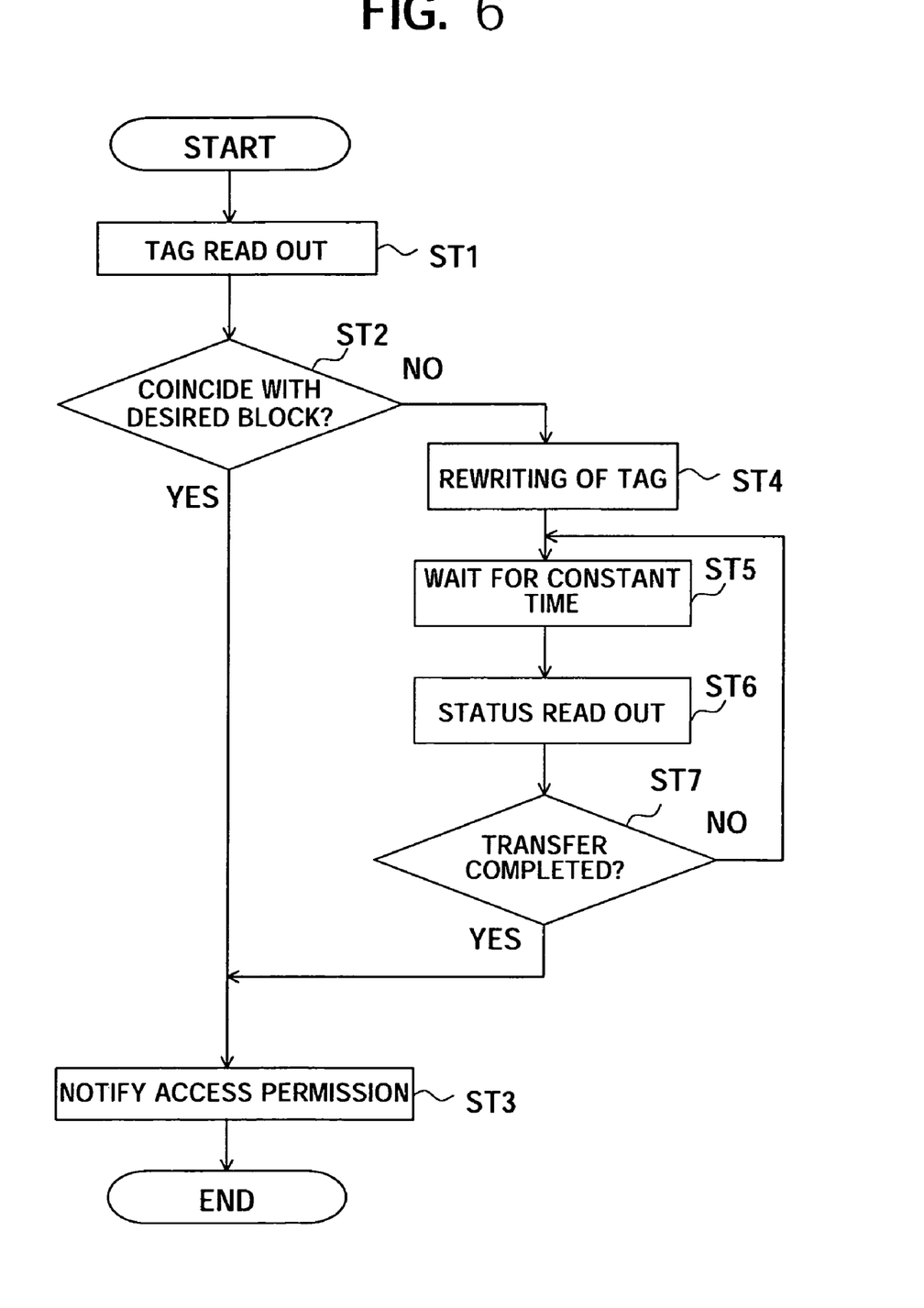
FIG. 6 is a flow chart showing an example of a management program executed when a host controller accesses the memory.

When accessing such a memory device 19a, the host CPU 11a can transfer a logical address on the system memory map to be accessed to the management program of FIG. 6 as it is and acquire the access permission. For example, when the logical address on the system memory map corresponds to an inherent logical address "07FFF" on the memory device 19a, a corresponding block address "1" is extracted from an upper significant bit thereof, and coincidence with the value stored in the TAG portion 42b is checked. When they are different, the TAG is rewritten, and the desired block is loaded on the SRAM 18a.

When the access permission is confirmed, the host CPU 112 accesses the logical address "07FFF" of the memory device as it is and can freely read and write the desired data.

In an extreme example, if the management program is executed whenever the memory device 19a is accessed, the host CPU 11a can use that as a usual general purpose memory which can be entirely random accessed. Note, in that case, hit detection of the cache becomes overhead every time. Therefore, desirably, the host side knows or predicts the already transferred blocks in the cache to a certain extent and keeps execution of the management program to the required lowest limit.

Naturally, the hit rate to the cache memory should be as high as possible. The above-explained example of the memory configuration is the simplest, but there are many variations in the units of transfer of blocks corresponding to a line of the cache, the mapping method between the internal cache and the memory, and the method of configuration of the TAG in the same way as a usual cache memory. Further, the optimum method thereof may change in accordance with a purpose.

Figure 8:
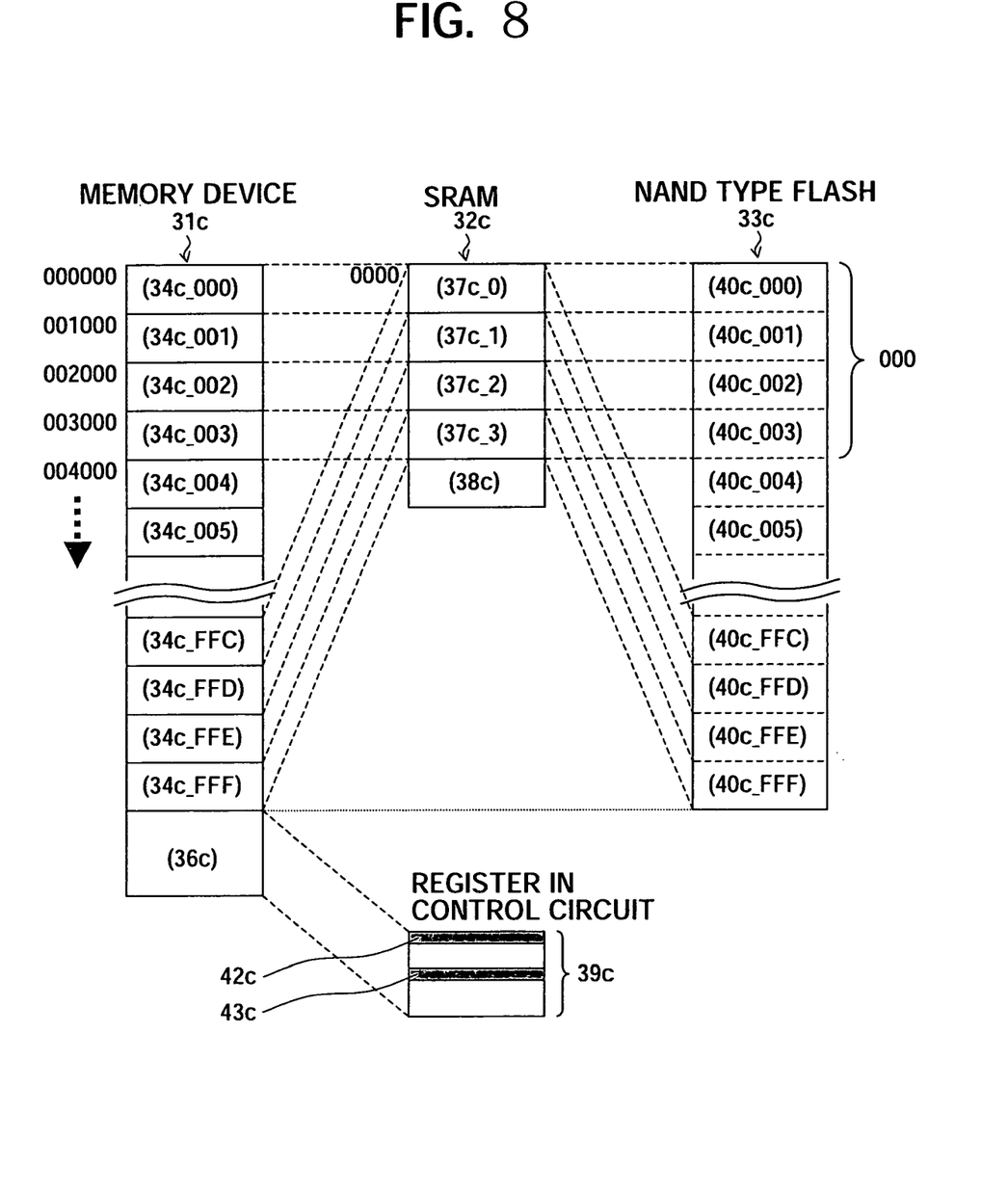
FIG. 8 is a diagram showing a third example of mapping of logical addresses of the memory device and logical addresses of the SRAM cache and a NAND type flash memory forming the inside thereof in the present embodiment.

FIG. 8 is a diagram showing a third example of mapping of logical addresses of the memory device 19a and logical addresses of the SRAM cache 18a and the NAND type flash memory 17a configuring the inside thereof in the present embodiment. In FIG. 8, as the third example of the mapping, an example where the size of the transfer block is reduced to ¼, four SRAM cache regions are provided, and the regions are linked with regions in the flash memory by direct mapping is shown.

In the example of FIG. 8, for a logical address 33c of the NAND type flash memory 17a, each erasure block formed by 1M bits (64 pages) was divided into four sections, and 256 bits (16 pages) were defined as the internal transfer block units. For example, the erasure block at an address 0 is divided to four internal transfer blocks (40c_000) to (40c_003).

The entire address region 32c of the SRAM 18a is divided to five areas, and four transfer blocks transferred from the flash memory 17a are stored in (37c_0) to (37c_3). These four cache areas uniquely correspond to the four divided sections of the erasure block region of the flash memory 17a. Namely, in this example, for example, what is linked with the area (37c_0) of the SRAM 18a is a header area obtained by dividing each erasure block. One block is selected from a group of blocks (40c_000), (40c_004), and (40c_FFC) and transferred for storage.

Further, the address region 38c of the SRAM 18a is used as the buffer or standby area at the time of writing.

For the register 39c in the control circuit 16a, four transfer block addresses corresponding to four areas in the SRAM are stored in the TAG region 42c. Further, a transfer completion flag for each block is displayed in the status register region 43c.

Note that the transfer block address here need only be one enabling judgment from which erasure block each is transferred and may be the address of the erasure block.

At the logical address 31c of the memory device 19a, for each four memory regions (34c_000) to (34c_003), (34c_004) to (34c_007), -, and (34c_FFC) to (34c_FFF), areas (37c_0) to (37c_3) of the SRAM 18a are mapped overlappingly. The register 39c in the control circuit 16a is mapped to the cache control region 36c.

Further, it is also possible to employ a configuration linking four cache regions with any regions in the flash memory at random.

Figure 9:
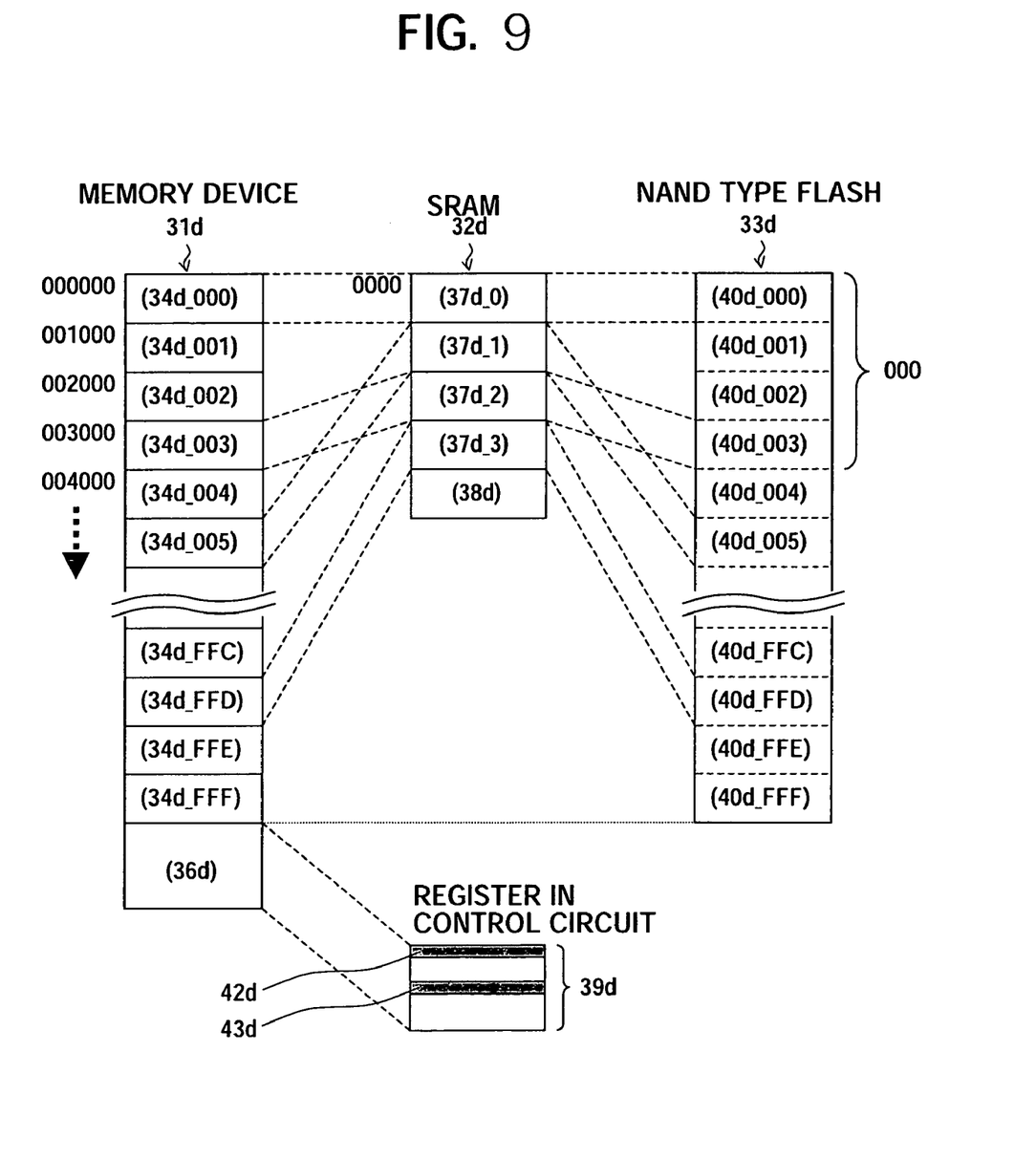
FIG. 9 is a diagram showing a fourth example of mapping of logical addresses of the memory device and logical addresses of the SRAM cache and a NAND type flash memory forming the inside thereof in the present embodiment.

FIG. 9 is a diagram showing a fourth example of mapping of logical addresses of the memory device 19a and logical addresses of the SRAM cache 18a and the NAND type flash memory 17a configuring the inside thereof in the present embodiment.

In this example, each of the four cache areas (37d_0) to (37d_3) in the SRAM 18a stores one region data freely selected from the transfer block areas (40d_000) to (40d_FFF) in the flash memory 17a.

In this case, the link of the mapping between the logical address 31d of the memory device 19a and the logical address 32d of the SRAM 18a dynamically changes according to the addresses of the blocks stored in the cache areas (37d_0) to (37d_3). For example, here, the address areas (37d_0), (37d_1), (37d_2), and (37d_3) of the logical address 32d of the SRAM are transferred the data of the blocks (40d_000), (40d_005), (40d_003), and (40d_FFD) of the logical address 33d of the NAND type flash memory 17a. Along with this, the regions of the SRAM 18a are mapped to the address areas (31d_000), (31d_005), (31d_003), and (31d_FFD) of the memory device 19a.

Such dynamic mapping change may be carried out as follows. For example, assume that an address "0030FF" in the area (34d_003) is accessed from the outside. A corresponding transfer block address is generated from the upper significant bits "003" of the address input to the memory device 19a. This is compared with the transfer block address in each cache area in the TAG region 42d. When there is a matching cache area, the input address is converted inside so as to access the corresponding area in the SRAM 18a.

Here, the block "003" is stored in the cache area (37d_2) of the SRAM 18a, and the logical address of the header word at the logical address 32d of the SRAM 18a is 2000. Accordingly, the input "0030FF" is converted to "0020FF" in the inside, and the access to the SRAM 18a is carried out thereafter.

Note that the probability of the existence of the desired data in the cache is generally highest in the sequence of the fourth example of mapping>third example of mapping>second example of mapping. However, in the fourth example of mapping, dynamic mapping update, etc. are necessary as explained above, and the configuration is slightly complex.

As described above, the semiconductor memory device of the present embodiment can be easily treated as a system memory and randomly accessed in the same way as a general purpose SRAM, DRAM, and NOR type flash memory, and therefore is not limited in application to file storage as in a NAND type flash memory in related art and is also suited for execution of applications. Further, if the system can be booted from the memory, it is possible to combine NOR type flash memories and construct an inexpensive, easy to handle memory system.

However, when using the memory device as in the present embodiment for the system boot, the biggest problem is that only simple memory access is possible in the initial period of the system boot. In general, a boot code is sequentially executed from the address 0 on the system memory. Accordingly, not even the management program shown FIG. 6 can be executed. When using a memory device having a built-in cache, cache hits cannot be judged and transfer instructions, etc. cannot be managed.

Figure 10:
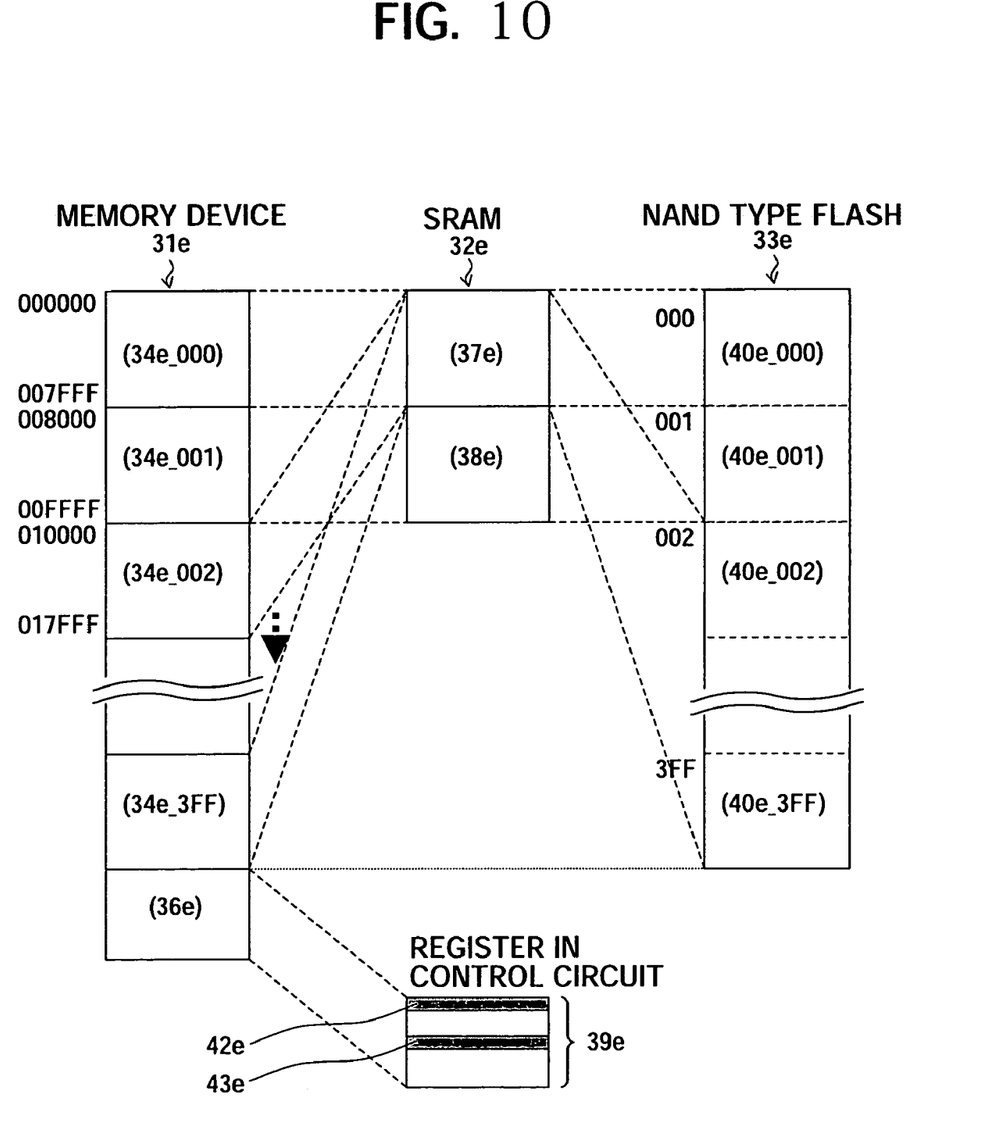
FIG. 10 is a diagram showing a fifth example of mapping of logical addresses of the memory device and logical addresses of the SRAM cache and a NAND type flash memory forming the inside thereof in the present embodiment.

FIG. 10 is a diagram showing a fifth example of mapping of logical addresses of the memory device 19a and logical addresses of the SRAM cache 18a and the NAND type flash memory 17a configuring the inside thereof in the present embodiment.

This fifth example of mapping is an example of the configuration of the second example of mapping provided with a function corresponding to a system boot.

The logical address 31e of the memory device 19a is mapped with the address areas of the SRAM 18a in the following way. Namely, the areas (34e_000) and (34e_001) are mapped to regions (37e) and (38e). This portion is used for the system boot. In the following blocks (34e_002) to (34e_3FF), the region (37e) is mapped overlappingly.

On the other hand, the address region 36e of the memory device 19a is mapped to the register 39e in the control circuit 16a. By accessing this portion, the internal state of the SRAM 18a can be judged, and data transfer between the SRAM 18a and the NAND type flash memory 17a can be controlled.

When detecting the power being turned on or receiving a reset signal from the outside, the memory device 19a automatically transfers the logical address areas (40e_000) and (40e_001) on the flash memory 17a in which the boot codes are stored to the cache regions 37e and 38e of the SRAM 18a corresponding to the system boot. By this, when accessing the boot areas (34e_000) and (34e_001), a hit to the cache is guaranteed to the host CPU 11a, and those areas can be accessed without a management program.

Further, at this time, when the management program shown in the above FIG. 6 and the code for transferring this management program to the system memory such as a DRAM are stored in the boot use area (40e_000) or (40e_001) of the flash memory 17a, by executing the previous transfer code, the management program can be opened up and stationed on the DRAM. Due to this, it becomes possible to freely access the areas (34e_002) to (34e_3FF) of the memory device 19a from then on.

Namely, by executing the management program according to need, the management program accesses the address region 36e for the cache control, transfers the desired blocks from the flash memory areas (40e_002) to (40e_3FF) to the SRAM cache region 37e, and enables access to the data.

By doing this, the memory device of the present embodiment can be used for the boot of the system and can be used for storage of the operating system, applications, and user data. A large size program which is not suited to execution in the cache may be transferred to the DRAM of the system memory according to need and executed therefrom.

Further, the management program as in FIG. 6 is very simple and is extremely small in size. Accordingly, when providing a specific small section in the logical address 32e of the SRAM 18a, stationing the management program read out at the time of the boot in that region, and always mapping it to a specific logical address of the logical address 31e on the memory device 19a, even a DRAM becomes unnecessary for the system so far as it is for low performance, low end applications.

In the case of a flash memory, the rewriting is slow and also a number of rewrites is limited to about 100,000 times, therefore this becomes a bottleneck in performance in the above case, but various non-volatile memories able to write data at a higher speed than a flash memory and having a strong rewrite tolerance such as ferroelectric memories and OUM have appeared in recent years. If using one of these as the medium in place of the NAND type flash memory 17a in FIG. 4, data transfer with the SRAM 18a becomes high speed in bi-directions. Such a memory is particularly suitable when deleting the DRAM 14a from the system and using only one memory device to construct an inexpensive system.

Note that, in the present embodiment, use was made of NAND type flash memories as examples of memory media, but the present embodiment is not limited to this application. In addition to NAND type flash memories, there are many other examples in which the driver circuit is made smaller by sacrificing the access time at the cell level and the decoder, control circuit, etc. are eliminated by limiting the functions to block access so as to reduce costs. The present embodiment is effectively applied to all such memories.

Further, in the embodiment, an SRAM was used as the cache memory, but the embodiment is not limited to an SRAM. A variety of semiconductor memories can be used according to the application so far as they are randomly accessible memories. For example, the embodiment can be applied to a use of, for example, a ferroelectric memory in order to prevent data loss at the time of the instantaneous interruptions in power and to the use of a DRAM in order to provide a large capacity cache cheaply.

Summarizing the effects of the embodiment of the present invention, according to the present invention, it is possible to use inexpensive, large capacity media such as NAND type flash memories originally designed for external memory devices and enabling only block access, treat them equivalently as with a DRAM, SRAM, NOR type flash memory, or other general purpose semiconductor memory, and make the pin configurations compatible. Accordingly, not only does the system configuration become simple and inexpensive, but also it can be directly connected to a high performance system bus. Therefore, there is almost no restriction as with an interface circuit. It becomes possible to make good use of the transfer performance of the memory with the smallest overhead. Further, from the host controller side, a block device driver requiring troublesome and sophisticated management becomes unnecessary, and the memory device can be almost directly accessed. Further, by just appropriately executing a simple management program, the application can treat the memory as part of the randomly accessible system memory. By this, the load on the application side can be reduced. Further, the memory can also be employed in a system boot, and the generally required two types of flash memory portions can be reduced to one type. Further, it is possible to configure the system by only a CPU and the semiconductor memory device.

It should be understood by those skilled in the art that various modifications, combinations, sub-combinations, and alterations may occur depending on design requirements and other factors insofar as they are within the scope of the appended claims or the equivalents thereof.

What we claim is:

1. A semiconductor memory device including:
a first semiconductor memory and
a second semiconductor memory, wherein
the second semiconductor memory is a cache of the first semiconductor memory,
the first semiconductor memory is accessed via the second semiconductor memory,
there are a first address region and a second address region on logical memory addresses accessed from the outside,
at least part of the second semiconductor memory is mapped to the first address region, and
further comprises a function of controlling data transfer between the first semiconductor memory and the second semiconductor memory by accessing the second address region.

2. A semiconductor memory device as set forth in claim 1, further comprising a function of transferring a desired block region data in the first semiconductor memory to the second semiconductor memory in accordance with predetermined information being written to the second address region from the outside.

3. A semiconductor memory device as set forth in claim 1, further comprising a function of judging whether or not the desired block region data in the first semiconductor memory is being transferred to the second semiconductor memory by predetermined data being read from the second address region.

4. A semiconductor memory device as set forth in claim 1, wherein the first semiconductor memory is a block access type large size memory, the second semiconductor memory is a random access type small size memory, and the data transfer between the first semiconductor memory and the second semiconductor memory is carried out in units of blocks.

5. A semiconductor memory device as set forth in claim 2, further comprising a function of transferring a desired block region in the first semiconductor memory to the cache region of the second semiconductor memory in accordance with predetermined information being written into the second address region from the outside and notifying completion of the transfer to the outside when the transfer is completed.

6. A semiconductor memory device as set forth in claim 1, wherein the first semiconductor memory is a non-volatile memory and comprises a function of detecting the power being turned on or a reset being input and automatically transferring and storing a predetermined region data of the first semiconductor memory to the second semiconductor memory.

7. A semiconductor memory device as set forth in claim 1, wherein the first address region is set in one-to-one correspondence with the logical address region of the first semiconductor memory and when the first address region is accessed, the corresponding region in the first semiconductor memory is accessed via the second semiconductor memory.

8. A semiconductor memory device as set forth in claim 7, wherein
correspondence information indicating which region of the first semiconductor memory is stored in which region of the second semiconductor memory is stored, and
when the first address region is accessed from the outside, the second semiconductor memory is accessed according to an internal address converted and generated from the input address and the correspondence information.

9. A memory control system comprising:
a semiconductor memory device and
a host device executing at least a management program to access the semiconductor memory device, wherein
the semiconductor memory device includes
a first semiconductor memory and
a second semiconductor memory,
the second semiconductor memory is the cache of the first semiconductor memory, the first semiconductor memory is accessed via the second semiconductor memory,
there is a first address region and a second address region at logical memory addresses accessed from the host device, at least part of the second semiconductor memory is mapped to the first address region,
further comprises functions of controlling the data transfer between the first semiconductor memory and the second semiconductor memory by accessing the second address region and transferring a desired block region data in the first semiconductor memory to the second semiconductor memory in accordance with predetermined information being written into the second address region from the host device, and
the host device executes a management program making the host controller write predetermined information into the second address region of the semiconductor memory device according to need when accessing the semiconductor memory device and making the semiconductor memory device transfer the desired block region to the cache region and, when the transfer is completed, notify the completion of the transfer to the host controller.

10. A memory control system as set forth in claim 9, further comprising a function of judging whether or not the desired block region data in the first semiconductor memory is being transferred to the second semiconductor memory by predetermined data being read from the second address region.

11. A memory control system as set forth in claim 9, wherein the first semiconductor memory is a block access type large size memory, the second semiconductor memory is a random access type small size memory, and the data transfer between the first semiconductor memory and the second semiconductor memory is carried out in units of blocks.

12. A memory control system as set forth in claim 9, wherein the first semiconductor memory is a non-volatile memory and comprises a function of detecting the power being turned on or a reset being input and automatically transferring and storing a predetermined region of the first semiconductor memory to the second semiconductor memory.

13. A memory control system as set forth in claim 12, further comprising a function of detecting the power being turned on or a reset being input and automatically transferring and storing at least a region in which said management program is stored to the second semiconductor memory.

14. A memory control system as set forth in claim 9, wherein the first address region is set in one-to-one correspondence with the logical address region of the first semiconductor memory and when the first address region is accessed, the corresponding region in the first semiconductor memory is accessed via the second semiconductor memory.

15. An access method of a semiconductor memory device including a first semiconductor memory and a second semiconductor memory, comprising steps of:
   accessing the first semiconductor memory via the second semiconductor memory using the second semiconductor memory as the cache of the first semiconductor memory,
   forming a first address region and a second address region at logical memory addresses accessed from the outside,
   mapping at least part of the second semiconductor memory in the first address region, and
   transferring data between the first semiconductor memory and the second semiconductor memory by accessing the second address region.

* * * * *